Patented Jan. 28, 1930

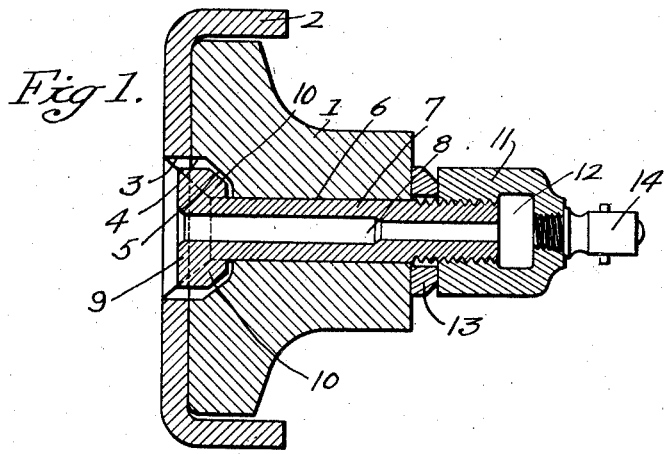
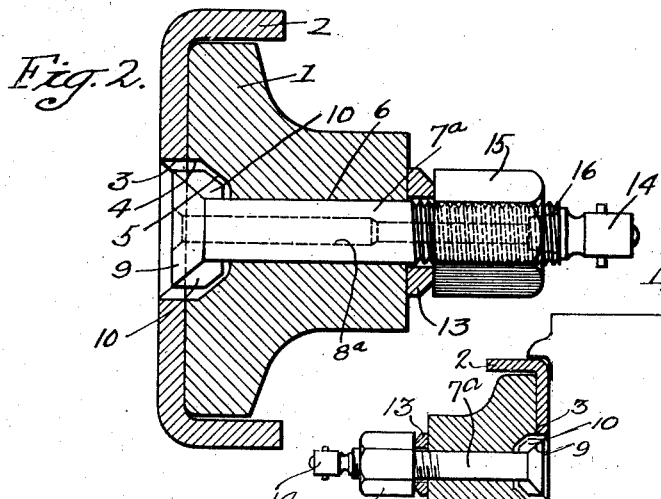
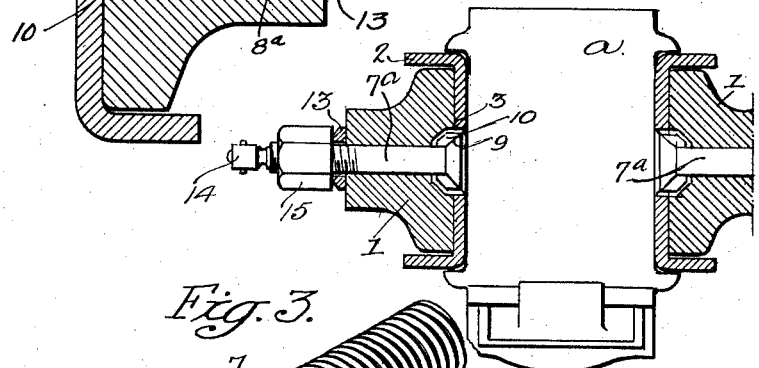
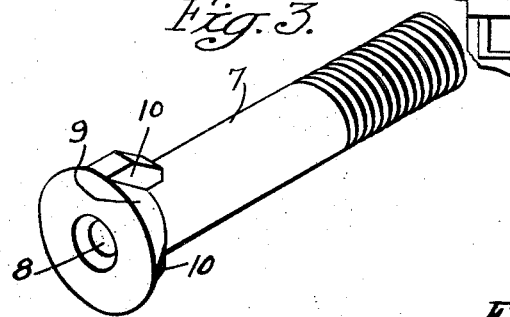

1,745,222

UNITED STATES PATENT OFFICE

ELMER LATSHAW, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA

PEDESTAL-GIB LUBRICATOR

Application filed September 13, 1928. Serial No. 305,690.

This invention relates to certain improvements in means for lubricating the surfaces of journal boxes and the gibs secured to the pedestals forming part of the frame of a railway car or car truck.

An object of the invention is to lubricate the surfaces through the bolts securing the gibs to the pedestals.

Another object of the invention is to so arrange the parts that the lubricant can be forced into the spaces by the use of an "alemite" or other gun as fully described hereinafter.

Other objects will appear in light of the accompanying specification and appended claims.

In the drawings:

Fig. 1 is a sectional view of one form of my invention;

Fig. 2 is a sectional view of another form of my invention, employing a conventional type of nut;

Fig. 3 is a perspective showing of the preferred form of bolt, and

Fig. 4 is a sectional plan view showing an axle box located between the pedestals of a car frame.

The axle box as shown in Fig. 4 is located between the pedestal 1 of the frame of a car or car truck. The gibs 2 are flanged at each side and overlap the pedestals as shown. Each pedestal has an opening 6 terminating in an enlarged recess 4 having beveled walls 5. The gibs 2 have openings 3 in line with the opening 6, as shown in Fig. 1. Each of them is tapered as at 5.

Extending through the opening 6 in each pedestal, is a bolt 7. This bolt, as clearly indicated in Figs. 1 and 3, is internally bored at 8 for the passage of a suitable lubricant. The head 17 of the bolt is tapered as at 9 and is received in the recess 4. To prevent turning with respect to the pedestal and pedestal gib, the bolt is provided with lugs 10 which enter slots 10ª in the walls of the openings 3 and 4. The bolt 7 is threaded at its outer end and on this end of the bolt is a nut 11 provided with an internally arranged reservoir 12 which opens into the channel 8 of the bolt.

If desired, a suitable spring washer 13 may be employed.

On the end of the nut is a suitable valved fitting 14 to receive the coupling of an "alemite" or other gun for forcing lubricant into the recess 12 and passage 8. The pressure forces the lubricant into the space between the box and the gibs and lubricates the entire surface of both gib and box.

The showing in Fig. 2 varies from the form illustrated in Fig. 1, in but a few details. The gib, pedestal, washer, and cap are all of the same type as shown in Fig. 1. However, the bolt 7ª is longer than the bolt 7 and is externally threaded for a greater length, for the reception of a nut 15, and between the nut and the pedestal is a lock washer 13. The fitting 14 is screwed into the end of the bolt as shown. This construction is slightly cheaper than the form shown in Fig. 1.

As it will be apparent to those skilled in the art to which this invention appertains, it is susceptible to numerous modifications and adaptations, and it is intended that it be limited only by the scope of the appended claims.

I claim:

1. In combination, an axle box; pedestals, pedestal gibs; and means extending through the pedestals and the gibs for lubricating the surface between the axle box and gibs.

2. In combination, an axle box; pedestals, pedestal gibs; a bolt extending centrally through each pedestal and the pedestal gibs, said bolts having passages therein through which said lubricant can be forced to the surface between the gibs and the axle box.

3. In combination, a pedestal, a pedestal gib, a bolt having a countersunk head, said bolt securing said pedestal and said pedestal gib together, and a channel for a lubricant for said gib extending through said bolt.

4. In combination, a pedestal, a pedestal gib, said pedestal and said gib each having cooperating passageways, a headed bolt extending through said passageways, lugs on the head of the bolt; the walls of the passageways having recesses for the reception of the lugs, and a channel extending through said bolt.

5. In combination, a pedestal, a pedestal gib, said pedestal and said gib each having cooperating passageways, a bolt extending through said passageways and being threaded at its outer end, a tapered head on the other end of the bolt, lugs on said head, the passageways accommodating said head and being recessed to receive said lugs, a channel extending through the bolt, a nut on the threaded end of the bolt, and a valved fitting on the open end of said bolt.

ELMER LATSHAW.